Figure 1:
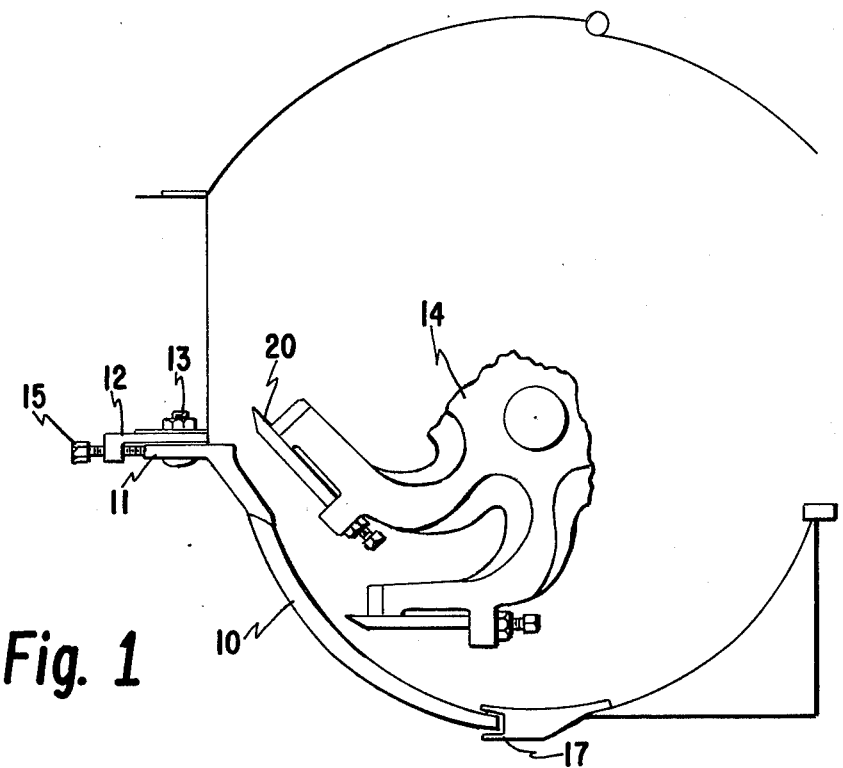

United States Patent [19]
Paulsen

[11] 3,963,183
[45] June 15, 1976

[54] RESHARPENABLE RECUTTER SCREEN FOR FORAGE HARVESTER

[75] Inventor: Earl W. Paulsen, Round Lake, Minn.

[73] Assignee: Leo M. Ling, Worthington, Minn.; a part interest

[22] Filed: Nov. 1, 1974

[21] Appl. No.: 514,559

Related U.S. Application Data

[63] Continuation-in-part of Ser. No. 278,736, Aug. 8, 1972, abandoned.

[52] U.S. Cl.............................. 241/88.4; 241/222; 241/239; 241/291
[51] Int. Cl.² ........................................ B02C 18/06
[58] Field of Search .................... 241/73, 85–86, 241/88–88.1, 88.2, 88.4, 188 R, 189 R, 220–222, 239, 241, 291, 300.1; 56/294, 504–505

[56] References Cited

UNITED STATES PATENTS

| | | | |
|---|---|---|---|
| 2,225,095 | 12/1940 | Beverly | 241/88.1 X |
| 2,385,767 | 9/1945 | Wagner | 241/88 X |
| 3,090,568 | 5/1963 | Wetmore | 241/73 |
| 3,194,288 | 7/1965 | Dodgen et al. | 241/88 X |
| 3,566,943 | 3/1971 | Witt | 241/88 |
| 3,817,464 | 6/1974 | Sousek | 241/222 |
| 3,829,030 | 8/1974 | Wallenfang et al. | 241/73 X |

*Primary Examiner*—Granville Y. Custer, Jr.
*Assistant Examiner*—Howard N. Goldberg

[57] ABSTRACT

For use in an agricultural forage cutter, a recutter characterized by open passageways for ready passage of the forage material and by a grindable cutting edge on the recutter adjacent the path of the rotating cutter knives whereby a shearing action is achieved.

8 Claims, 13 Drawing Figures

3,963,183

RESHARPENABLE RECUTTER SCREEN FOR FORAGE HARVESTER

This application is a continuation in part of an application filed by this same inventor dated Aug. 8, 1972 and bearing Ser. No. 278,736, now abandoned.

BACKGROUND AND SUMMARY OF THE INVENTION

This invention pertains to agricultural forage harvesters and more particularly to an improved recutting means in the recutting section of the harvester.

Forage harvesters are used by many farmers for the cutting and loading of chopped forage material. This material may be hay crops or the plants of many grain crops either before or after the grain is harvested. The harvester is built to include at least three operations in most instances. First, the crop is either picked up from a windrow into which it has been laid by other machinery, or in some cases it may be directly cut from the ground. Second, it passes to a recutter where it is chopped into small bits. Third, it is blown through a chute into a wagon or other container for transportation or storage.

In the ordinary machine, the recutter section includes a rotating cutter unit and a screen through which the material passes on its way to the blower. The cutter is ordinarily a rapidly moving series of knives which engage the material and chop it into bits as it enters the cutter. However, much of the material is not cut by the chopping action and so it is necessary that an edge be provided for shearing that material between it and the rotating blades. The screen is a convenient means of providing a blade against which the rotating blades may shear, and several types of screens have been proposed.

Previous screens have been principally curved members having punched slots or holes. These openings provide a passage for the material to go through and also provide cutting edges. However, in no case is there any provision for sharpening the edges. As they become dull, there is more and more power required to drive the cutter and it becomes less and less efficient.

By my invention I provide for a recutter which effectively allows passage of the material while also providing a cutting edge, or a plurality thereof which can be resharpened to provide for a continued high efficiency cutter.

FIGURES

Figure 2:
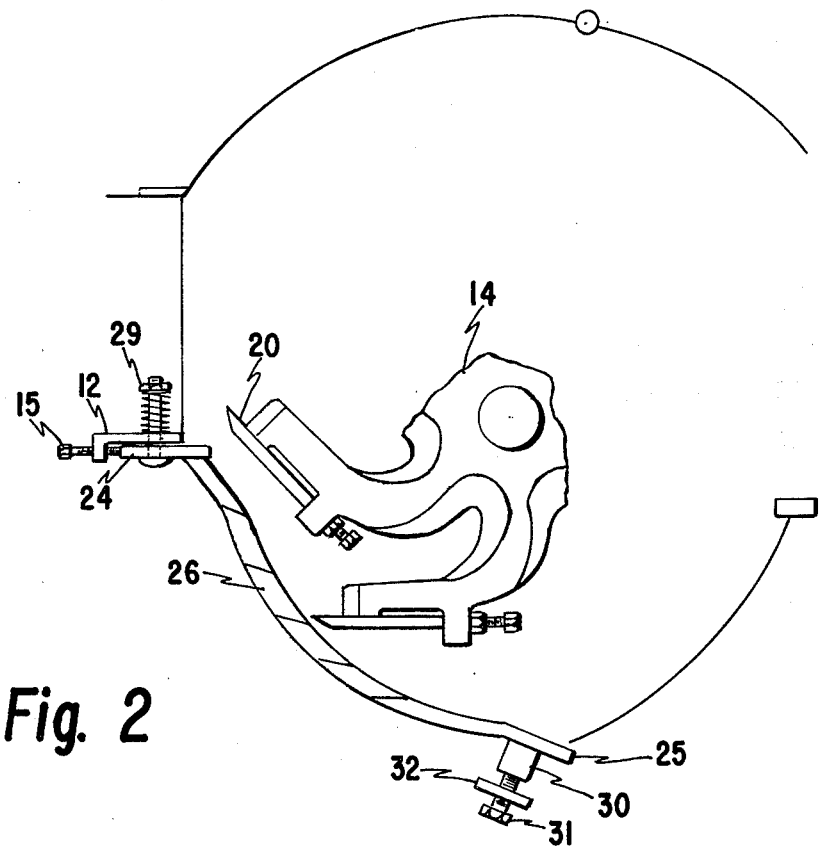
Figure 3:
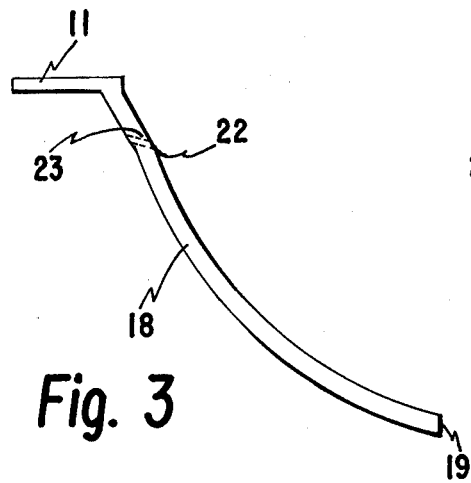
Figure 4:
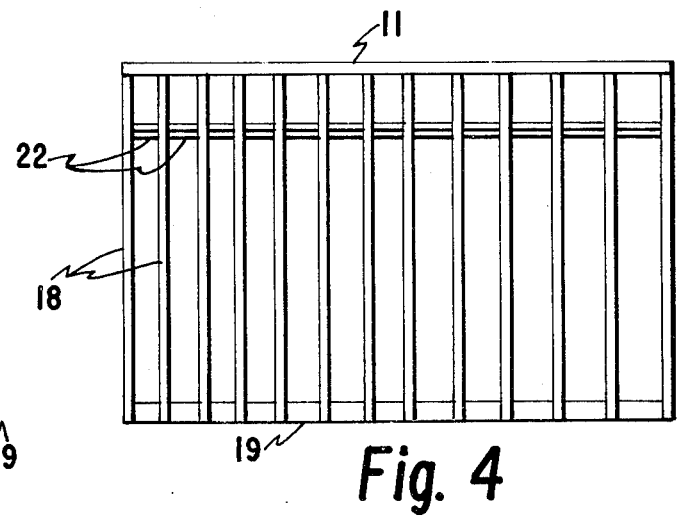
Figure 5:
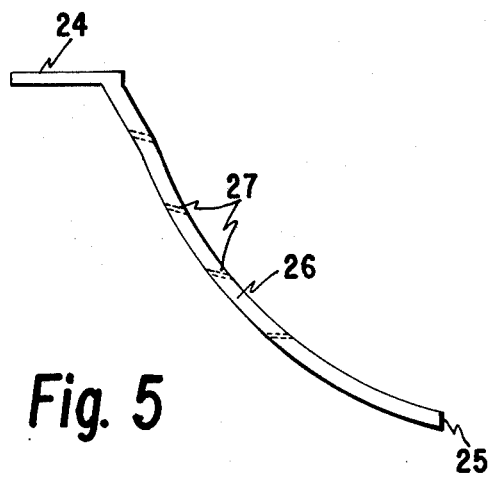
Figure 6:
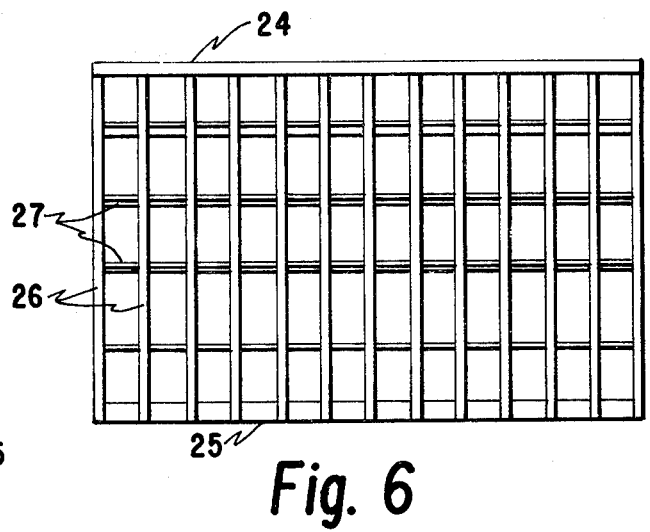
Figure 7:
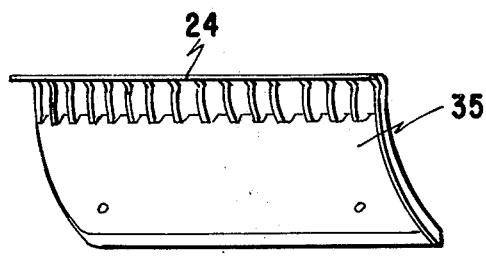
Figure 8:
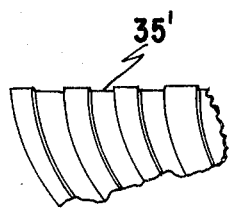
Figure 9:
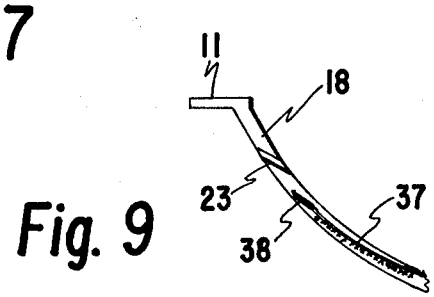
Figure 12:
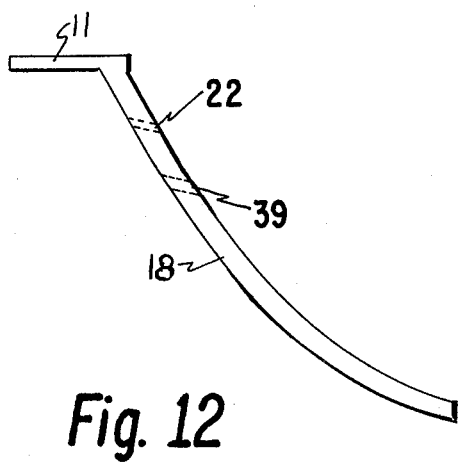
Figure 10:
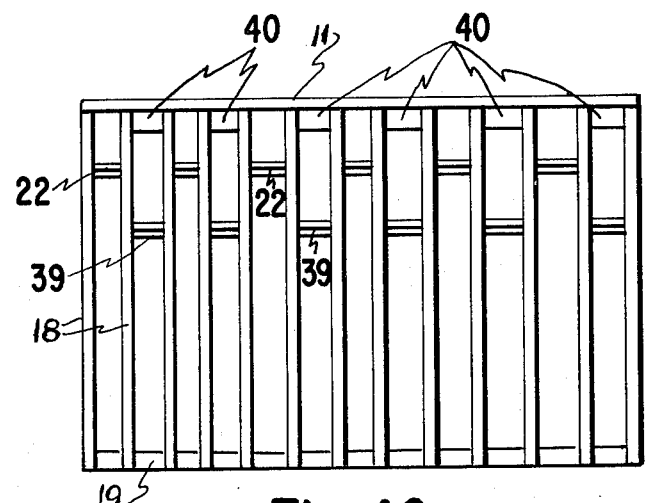
Figure 13:
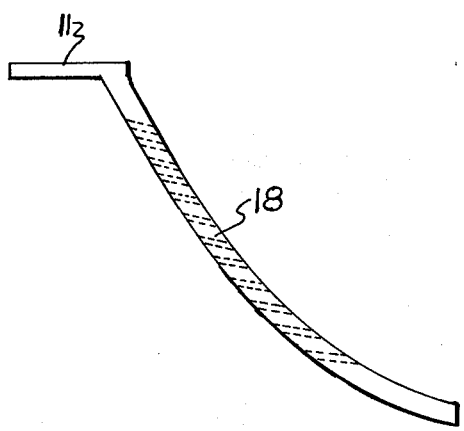
Figure 11:
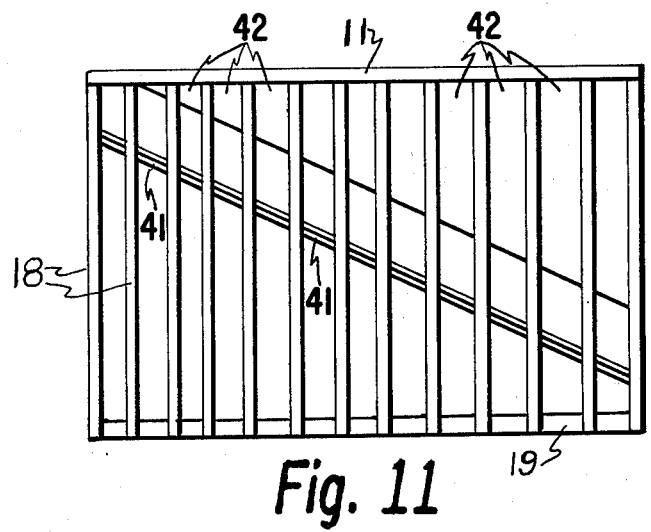

FIG. 1 is an end elevational view of my screen in place in a cutter and showing the cutter blades and other surrounding parts, FIG. 2 is a view similar to FIG. 1 of slightly different embodiment of my invention and illustrating different means for adjustment, FIG. 3 is an end elevational view of the screen of FIG. 1 removed from the machine, FIG. 4 is a front elevational view of the screen of FIG. 3, FIG. 5 is a view similar to FIG. 3 of an alternative screen, FIG. 6 is a view similar to FIG. 4 of the screen shown in FIG. 5, FIG. 7 is a perspective view of a screen having an attachment to provide somewhat different application, FIG. 8 is a fractional view showing another possible variation of the attachment shown in FIG. 7, FIG. 9 is a sectional view showing the edge of the bars and showing another alternative form of the attachment, FIG. 10 is a view similar to FIG. 4 showing a first alternate configuration, FIG. 11 is a view similar to FIG. 4 of the second alternate configuration, FIG. 12 is a view similar to FIG. 3 of the device of FIG. 10, and FIG. 13 is a view similar to FIG. 12 of the device of FIG. 11.

DESCRIPTION

Briefly my invention comprises a recutter having circumferential bars and a lateral cutting member running across those bars. The cutting member is oblique to the bars so that a grinding wheel passing along the face of the bars will sharpen an edge on the lateral member. Variations in the number of lateral members are provided as are attachments to adapt the device for cutting various different materials.

More specifically and referring to the drawings, my device includes a screen like member 10 having a flange 11 adapted to slide adjustably along a fixed rail 12 in the machine. The flange is held by a bolt and nut arrangement 13 extending through a slotted or oversized opening (not shown) in the flange 11. Thus when the bolt 13 is not tightened the flange can be adjustably moved toward or away from the cutter 14 by a screw 15 abutting the edge of the flange 11. The screen 10 is held at its edge opposite the flange 11 by insertion into a channel shaped member 17 also fixed in the machine.

The screen 10 is shown in FIGS. 3 and 4 in more detail. As shown in FIG. 4, the screen consists of a series of curved substantially arcuate bars 18 extending from the flange 11 to a base member 19. These bars are preferably spaced closer together at one end of the screen than at the other. This is done to allow better passage of material through the screen.

Most cutters 14 (FIG. 1) have the blades 20 arranged in spiral fashion similar to a reel-type lawn mower. Therefore, one end of the blade reaches the screen earlier in any given rotation than the rest of the blade. The spiral has a tendency to carry the material across the screen axially of the cutter so that there is often a build-up of material on one edge of the screen. By spacing the bars 18 farther apart at that edge, I provide greater open space at the end where the build up would normally occur. Thus, added space is allowed for this material to pass through and the normal build up is avoided.

The usual rotation of the cutter is upward across the screen. At the upper part of the screen, I provide a shearing edge 22 formed by welding or otherwise fastening a series of pieces 23 extending across the openings between the bars 18. These pieces may be of hardened steel or the like so that they will hold a proper edge. The pieces are placed so that the edge is co-incident with the inner surface of the bar 18, and at an angle to the face of the bar such that the cutting edge is an acute angle. This angle should be such as to provide a sharp cutting edge at its lower edge. Thus a grinding wheel can be run across the inner surfaces of those bars at the edges 22 and the edges will again be sharpened. After sharpening, it may be necessary to readjust the position of the screen slightly in order that proper shearing action may occur between the blades 20 and the edges 22. This is readily accomplished by use of the screw 15 to adjust the flange 11 to a position at which the blades 20 will just touch the edges 22. Then the screen can be backed away very slightly to avoid dulling the edges, but to preserve the shearing, cutting action between the blades 20 and the edges 22. It should be noted that the bars 18 drop away from the center of rotation of the blades at that location after passage of the blades 20 past the edge 22.

The screen shown in FIGS. 2, 5 and 6 is quite similar to that just described. However, there are differences. Essentially, the screen is again composed of a flange 24 and a base piece 25 with a series of nearly arcuate bars 26 extending therebetween. Between these bars I provide a series of rows of pieces 27 similar to the pieces 22 previously described. The use of a plurality of rows provide for much more cutting action and may be desirable for certain crops.

Certain adjustments are necessary in the use of this latter type screen. In sharpening the edges of the pieces 27, it is necessary to run the grinder along the edge of the piece. However, it may also be necessary to relieve the bar 26 behind the edge so that there will be clearance of the blades to pass across the screen. Also, after sharpening, and because proper shearing action is desired at all edges, it may be necessary to provide dual adjustment as shown in FIG. 2. The upper adjustment is similar to that in FIG. 1 except that I have illustrated a spring loaded bolt and nut device 29 to permit adjustment at this point without necessarily releasing a tightly clamped flange. As in the device of FIG. 1, the flange 24 is formed with slotted openings through which the bolt of the device 29 extends so that some sliding adjustment of the flange is possible.

Added adjustment is permitted by having the base 25 include an abutment 30 engaged by a screw 31 threaded into a fixed member 32. The member 32 is permanently attached to the machine. Therefore, by running the screw 31 into the member 32, the base piece 25 is raised to provide adjustment at this end while the other end is also adjusted through the sliding flange 24.

In some cases, particularly where ear corn is to be chopped, it may be necessary to reduce the opening somewhat. In order to accomplish that, I provide a removable shield 35 (FIG. 7) adapted to be fastened to the screen. This shield may be flat as shown in FIG. 7 or fluted as shown at 35' in FIG. 8. The fluted shield 35' is useful for reducing the opening even more than the flat shield if desired. These shields are attachable to the screen by the use of machine screws threaded into tapped holes in the bars 18 or may be supported by any common means such as a bracket from the basic machine. For example, the shield may also be held at one edge at least, by the channel 17 (FIG. 1).

The flat shield obviously will reduce the amount of space through which material can travel through the screen. The only space left is that between the edge of the shield 35 nearest to the sharpened edge 22 of the piece 23 and that piece. In many instances this could be just about equal to the thickness of the bars 18. However, by fluting the shield as illustrated at 35', that space is further reduced by the simple expedient of bringing the edge of the shield closer to the piece 23.

Still another device for reducing the opening is illustrated in FIG. 9. Here the bars 18 as used in my first embodiment support the pieces 23 as shown in FIG. 3. In order to reduce the opening, a shield 37 is fastened in each space between the bars. Each shield piece is fastened by welding or the like to the adjacent bar 18 along a substantial portion of the length of the shield piece, but has a free tip 38 which can be bent to either open the gap somewhat or close it a little. Thus, there is an adjustable shield permitting some variation in the opening. Preferably the shield starts flush with the inner edge of the bar 18 and slopes slightly away from the center of rotation of the cutter. It will be obvious that this type of shield can be utilized in either the embodiment having a single cutting edge or the plurality of cutting edges.

In FIGS. 10 and 11 I illustrate some alternative arrangements of the cutting edges. It is envisioned that the edges need not be aligned necessarily in a single straight line across the screen. For example, in FIG. 10, the alternate cutting edges 39 are offset somewhat lower on the screen than the original edges 22. In this way, the material being cut can be sheared by the rotating blade at two different positions in the rotation of the blade, and the impact of the cut may be spread more evenly during the time of rotation. However, the blade still remains flush with the inner surface of the arcuate bars so that the cutting edges can be resharpened readily.

In order to preserve the size of the discharge opening above the cutting edges 22 and 39, it may be necessary in this configuration to add covering shields 40 extending from the upper flange 11 to provide approximately the same size discharge opening in those spaces in which the cutters 39 are lower on the screen.

The device illustrated in FIG. 11 would be considerably more expensive to build than my preferred embodiment and therefore is less desirable. However, by aligning the cutting edges 41 in a spiral row along the face of the screen, and then providing shields 42 extending from the flange 11 to provide the proper discharge opening, it may be possible to provide a more even shearing action between the rotating blades and the edges on the screen. In any event, it would be possible to construct such a screen with resharpenable edges to provide the cutting action, which is the basis of the invention claimed in this application.

From the foregoing description it will be apparent that I have provided a screen which is not only initially better because of the sharpened edge of the cutter and the more open screen at the edge where material piles up, but also one which will be longer lasting — or at least be useful longer — because it can be resharpened.

I claim:

1. For use in a forage harvester including a rotating cutter carrying blades; a recutter screen comprising an upper flange and a lower base member joined together by substantially arcuate bars extending between said flange and said base member, a series of pieces extending between said bars and spaced from said flange and base member, said bars each having an inner surface adjacent to the path of the blades on the rotating cutter, said pieces being fixed between said bars, and having inner surfaces coincident with the inner surface of said bars, said pieces being fixed to the bars so that each of the inner surfaces of said pieces intersects another adjacent surface of said piece to form an acute-angled, resharpenable cutting edge adjacent the path described by said blades on the rotating cutter, said cutting edge thereby lying in the plane of the inner surfaces of said bars.

2. The device of claim 1 in which said bars are differentially spaced so that the distance between them is less at one edge of said screen and greater at the other edge than the mean distance between the bars.

3. The device of claim 1 in which shield means is attached to the outer surface of said bars and extends from adjacent said base member substantially to said cutting edges.

4. The device of claim 3 in which said shield is fluted with the fluted part of said shield extending into the spaces between the bars.

5. The device of claim 1 in which adjustment means on said harvester engage both the upper flange and the lower base member so that said screen may be adjusted at both ends in said harvester.

6. The device of claim 1 in which the cutting edges form a single row across said screen.

7. The device of claim 1 in which the cutting edges are staggered to form single edges between each pair of bars, said edges not being in a single row, and shield means between some of said bars extending from said flange so that the openings between said edges and said flange is substantially of equal arcuate distance.

8. The device of claim 1 in which the cutting edges for a continuous spiral row along said screen and shield means between some of said bars extending from said flange so that the openings between said edges and said flange is substantially of equal arcuate distance.

* * * * *